H. C. HANSON.

FOLDING CAMP STOVE.

APPLICATION FILED OCT. 19, 1921.

Reissued Apr. 4, 1922.

15,325.

2 SHEETS—SHEET 1.

INVENTOR.
HANS C. HANSON.
BY HIS ATTORNEY.
James F. Williamson

H. C. HANSON.
FOLDING CAMP STOVE.
APPLICATION FILED OCT. 19, 1921.
Reissued Apr. 4, 1922.
15,325.
2 SHEETS—SHEET 2.
Fig. 6.
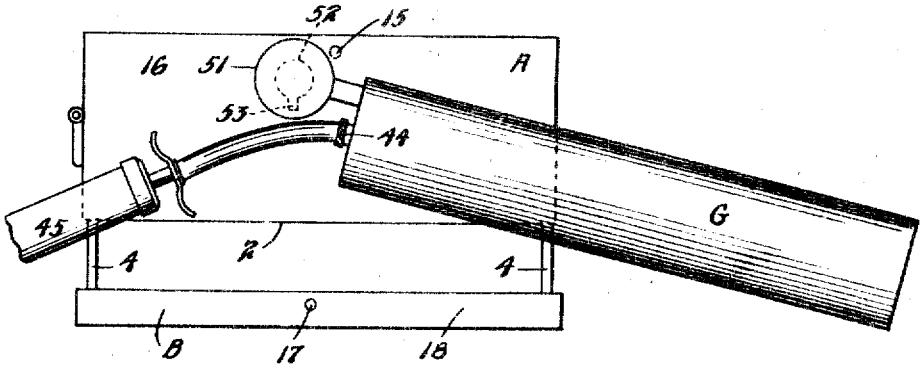
Fig. 7.
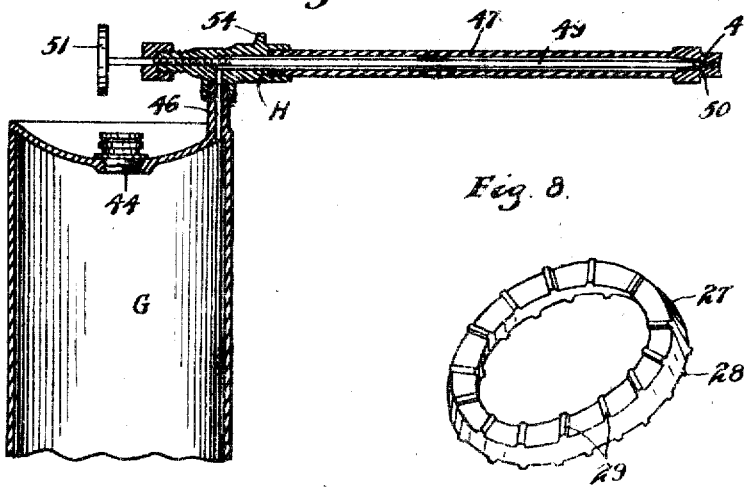
Fig. 8.
Fig. 9.
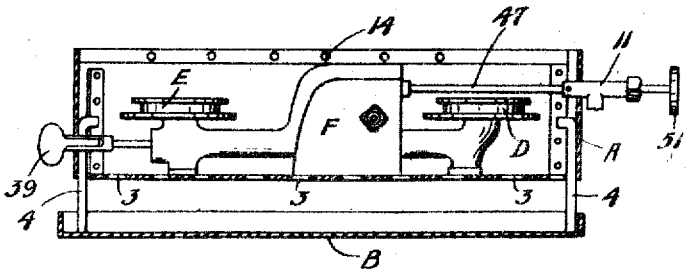
INVENTOR.
HANS C. HANSON.
BY HIS ATTORNEY.
James F. Williamson

UNITED STATES PATENT OFFICE.

HANS C. HANSON, OF ALBERT LEA, MINNESOTA, ASSIGNOR TO AMERICAN GAS MACHINE COMPANY, OF ALBERT LEA, MINNESOTA, A CORPORATION OF MINNESOTA.

FOLDING CAMP STOVE.

15,325. Specification of Reissued Letters Patent. Reissued Apr. 4, 1922.

Original No. 1,387,152, dated August 9, 1921, Serial No. 181,938, filed July 21, 1917. Application for reissue filed October 19, 1921. Serial No. 508,893.

*To all whom it may concern:*

Be it known that I, HANS C. HANSON, a citizen of the United States, residing at Albert Lea, in the county of Freeborn and State of Minnesota, have invented certain new and useful Improvements in Folding Camp Stoves; and I do hereby declare the following to be a full, clear, and exact description of the invention, such as will enable others skilled in the art to which it appertains to make and use the same.

This invention relates to improvements in folding camp stoves, and more particularly to that type employing a hydrocarbon burner. More particularly, this invention relates to a stove which can be packed in compact form and easily and quickly unfolded and adjusted for use, and which when unfolded and adjusted produces a simple and effective stove for cooking and heating purposes.

In the accompanying drawing forming part of this specification.

Fig. 6 is an end view;

Fig. 7 is a section of a detail of the hydrocarbon supply tank;

Fig. 8 is a perspective part of one of the burners; and

Fig. 9 is a longitudinal section through the stove assembled for use, said section being on a reduced scale.

Figure 1:
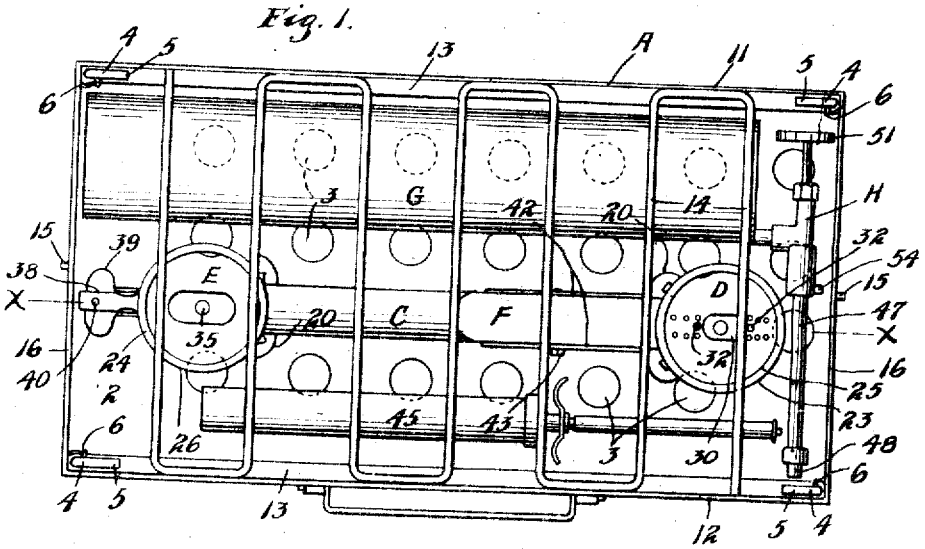
Fig. 1 is a plan of my invention when packed for transportation and the cover is removed.
Figure 2:
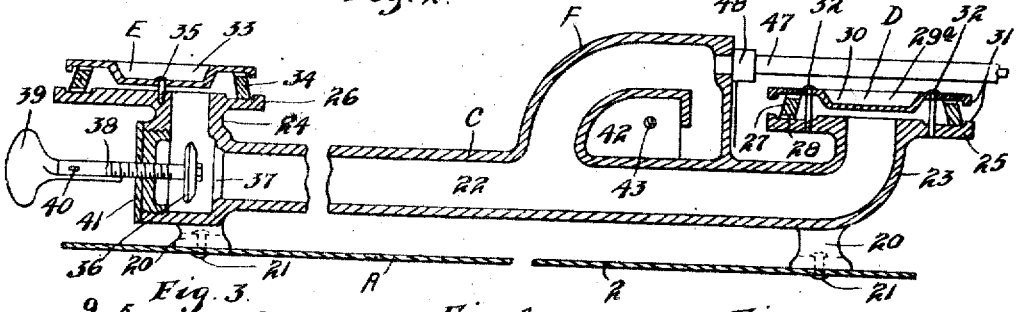
Fig. 2 is a section of a detail of the burner taken on the line X—X of Fig. 1.
Figure 3:
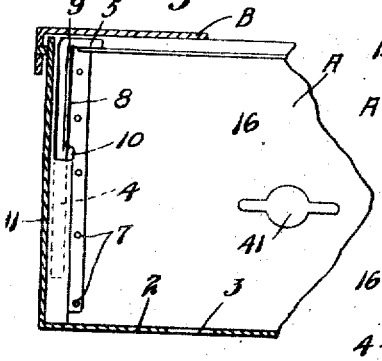
Fig. 3 is a section of a detail of the receptacle looking at the side through which the handle 39 is adapted to move.
Figure 4:
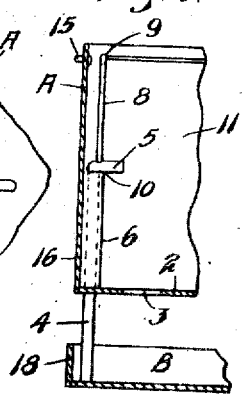
Fig. 4 is a section of a detail of the receptacle when its body is erected on the cover.
Figure 5:
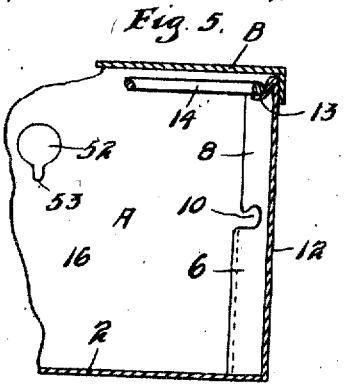
Fig. 5 is a section of a detail looking towards the end through which the tube 47 is inserted.

In the drawing, let A indicate the body of the casing, which is of rectangular form and resembles a receptacle of medium depth, the bottom 2 of which is provided with a plurality of draft openings 3 through which air is free to pass upwardly into the receptacle to supply oxygen to the flames of the burners. Each corner of the receptacle is provided with a movably disposed leg 4 in the form of a vertical rod having an offset or shoulder 5 at its upper end, said rod being slidably engaged in a tube 6 in the corner of the receptacle, said tube being secured by rivets 7 or other suitable means to the casing and being provided with a longitudinal opening 8 or passage in its side through which the shoulder end of the rod may slide freely. When the camp stove is folded the legs are slid upwardly and the shoulder 5 of each lodged over the upturned upper end 9 of the tube member in which the leg is held, the shank of said leg being turned into engagement with said upper end. When the camp stove is unfolded each leg is moved into extended position by giving the same a quarter turn and sliding it downwardly. While in lowermost position the leg is turned and the shoulder 5 enters a key slot or lateral passage 10 in the tubular member where the leg is locked in extended position and prevented from receding upwardly. In Fig. 3 the leg is illustrated in folded condition while in Fig. 4 it is locked in extended position as described. The legs and their holding means are all similar in construction, there being one provided in each corner of the receptacle. The upper portion of the sides 11 and 12 of the receptacle are provided with a pair of horizontal longitudinal ledges 13 upon which rest a grate 14, said grate being made out of a single rod formed into rectangular convolutions, the ends of said convolutions being adapted to rest on the ledges 13, as illustrated in Fig. 1. This grate is separable from the receptacle as also are the legs, so that the parts can be separated and easily cleaned from time to time. A removable cover B is provided on the receptacle, which can be securely closed thereover by means of the studs 15 on the ends 16 of the receptacle, which are adapted to be sprung into engagement with the cover through openings 17 in the ends 18 of the cover, (see Fig. 3). When the stove is in use and the cover removed, the cover can be inverted and used as a tray to support the extended legs of the receptacle.

Disposed within the receptacle is a burner fixture C formed with supports 20, which are rigidly secured to the bottom 2 of the receptacle by rivets or bolts 21. The burner fixture is in the form of a duct 22 having upturned ends 23 and 24. The ends 23 and 24 are formed with horizontal burner bases 25 and 26, of burners D and E, resembling disk or circular plates. A burner cap on base member 25 is in the form of a ring member 27 having radiating ribs 28 on its lower surface and radiating ribs 29 on its upper surface forming channels through which gas from the duct 22 may pass outwardly. Secured over the ring 27 is a burner cap 29ª, which is formed by a plate having a shallow centrally disposed cup 30, in which gasoline or other hydrocarbon liquid may be placed and ignited for heating the burner to start the generation of gas. The outer peripheral edges of the cap pieces 29ª and the base member 25 are formed with inturned shoulders 31 which act as deflectors to direct the flow of gas through the channels between the ribs 28 and 29 and commingle the constituent parts of the gas to form an effective gaseous fuel medium. The cap member 29ª is secured on the ring member 27 and to the base member 25 to hold said parts together by means of the screws 32. The burner E on the upturned end 24 of duct 22 is similar in construction to the parts of the burner D just described, excepting that the cap piece 33 is secured over the ring member 34 and to the base member 26 by a single screw 35.

The supply of fuel mixture to the burner E is controlled by a valve 36, which is adapted to seat at 37 in the duct and is provided with a threaded valve stem 38 having a key 39 slidably mounted thereon, said key being joined to the valve stem 38 by a lug and slot connection 40, whereby the key 39 may be extended or receded through an opening 41 in the end of the receptacle A, said key being extended when it is desired to turn the valve and open or close the same. The valve stem 38 is threaded in a stopper 41 in one end of the duct.

Fuel mixture is admitted into the duct through an upwardly and longitudinally extending branch F disposed between the burners D and E. The sides of this branch are closed by a removable cover member 42, which is secured in closed position by means of the bolt 43, said cover being provided so that the branch and duct may be cleaned at any time by removing it. Hydrocarbon such as gasoline under air pressure is supplied by the tank G, a suitable connection or stopper 44 being provided through which the tank can be filled and air pressure applied by means of the pump 45 or other suitable means. A suitable supply nozzle is secured and connected with the tank by the threaded coupling 46, said nozzle being provided with a gas generating tube 47, which has a coupling member 48 on its outer end, said coupling member being adapted to be detachably secured in the upper end of branch member F and connected with the duct therein to supply the hydrocarbon mixture from the supply tank to the burners. The point at which the coupling 48 is attached to the branch is disposed so that the generating tube 47 will extend across and immediately above the burner D whereby heat from the burner either supplied by the burning gases from the fuel in the cup 30 or from the burner proper will start and continue the generation of gas in the tube before it is admitted into the duct C. The supply nozzle H has threaded therein the stem 49 of a valve 50, which is seated in the coupling member 48. The valve stem is threaded in the nozzle member H and extends outwardly therefrom being provided with a handle 51 by which it can be turned. The nozzle member passes through an opening 52 in one of the end walls 16, said opening being formed with a key receiving slot 53, which admits a key 54 on the side of the nozzle member, so that when the supply tank is adjusted to the burner by inserting the nozzle through the opening 52 and applying the coupling 48 to the branch duct F, said parts can be locked with the key 54 against the inner face of one of the walls of the receptacle to prevent the supply tank from being unintentionally detached from the burner fixture when in use. It will be noted that the burner cap 29ª is provided with the usual perforations immediately below the gas generating tube 47, through which some of the gas may pass to produce a heating flame below, and in contact with the generator tube to heat the latter.

In use, assuming the stove to be folded, the cover is first removed and the legs extended and locked in extended position and then placed with their lower ends upon the inverted cover. The supply tank after being removed from the receptacle is inflated by pumping air into it and is secured by its generating tube to the receptacle. A small amount of gasoline is then placed in the cups of the burners and ignited. After the burners and generating tube have been heated by burning the gasoline in the cups the valve 50 is opened by turning the handle 51. The gas generated by the generating tube is thus admitted into the duct from whence it passes outwardly through the burners and is ignited. The resulting flames continue the generation of gas in the burner tube and in the duct, and as a result an efficient heater is provided for cooking and heating purposes by the burners. When desired only one burner need be operated, the valve 36 being provided for cutting off the supply of gas to the burner E. The parts of the device can easily and quickly be cleaned from time to time when desired by separating them.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

What is claimed is:

1. A folding camp stove having in combination a substantially rectangular casing having a perforated bottom, a stove having a plurality of burners fixedly secured to said bottom, said burners being disposed wholly within said casing, legs at each corner of said casing adapted to be received therein, said bottom having holes through which the legs are adapted to be extended when the stove is set up for use, and means on said casing for holding said legs extended.

2. The structure set forth in claim 1, and a regulating valve for one of said burners comprising a threaded stem and a handle slidably connected to said stem so as to turn the same, said casing having an opening in one end through which the handle is adapted to be projected for controlling said burner from without the casing when the stove is in operation.

3. The structure set forth in claim 1 and a supply tank for a liquid fuel for said stove constructed and arranged to be carried in said casing at one side of said stove.

4. The structure set forth in claim 1 and a supply tank for liquid fuel for said stove, means extending therefrom and adapted to be connected to said stove, said casing having an opening in one end to receive said means, a locking device on said means co-operating with said casing for preventing withdrawal of said means when connected to the stove.

5. The structure set forth in claim 4, and a regulating valve carried by said means outside of said casing.

6. A folding camp stove outfit having in combination a substantially rectangular casing having a perforated bottom, a plurality of legs disposed in said casing, said casing having holes therein through which the legs are adapted to be extended and having means for holding the legs in extended position, a burner stove permanently secured to said bottom, a fuel tank having a connection conduit thereon, said tank and connection being adapted to be disposed in said casing at one side and one end, respectively, of said stove, said casing also being provided with an opening in one end to receive said connection when the stove is in operation with the tank disposed outside thereof.

7. The structure set forth in claim 6, said casing having a ledge near the upper edge of its side portion, and a grid member adapted to be supported on said ledge below the top edge of the casing.

8. The structure set forth in claim 7, a flange cover adapted to fit over the top of the casing, and means on the casing engaging said cover to hold the same in position.

9. A folding camp stove having in combination a substantially rectangular casing having a perforated bottom, a stove having a plurality of burners fixedly secured to said bottom, said burners being disposed below the top of said casing, legs at each corner of said casing adapted to be received therein, said bottom having holes through which the legs are adapted to be extended when the stove is set up for use, means on said casing for holding said legs extended, said casing having a ledge at the upper inner side thereof, and a grate adapted to be supported on said ledge.

10. A folding camp stove having in combination a substantially rectangular casing having a perforated bottom, a stove having a plurality of burners fixedly secured to said bottom, said burners being disposed wholly within said casing, a regulating valve for one of said burners comprising a threaded stem and a handle slidably connected to said stem so as to turn the same, and adapted to be disposed in one position within said casing, said casing having an opening in one end through which said handle is adapted to be projected for controlling said burner from without the casing when the stove is in operation.

11. The structure set forth in claim 10, and a detachable fuel supply tank having a connection therein, said casing having an aperture therein through which said connection is adapted to pass to be connected to said stove.

12. A folding camp stove having in combination a casing, a burner stove permanently secured in said casing and disposed wholly within said casing, supporting means for said casing, a detachable fuel tank having a rigid connecting member attached thereto, said tank and member being adapted to be wholly disposed in said casing when detached, said casing having an aperture through one wall thereof through which said connecting member is adapted to pass and be connected with said stove when the same is assembled for use with the tank disposed outside of said casing.

13. A folding camp stove having in combination, a casing, a stove having a plurality of burners secured in said casing and wholly disposed therein, a detachable fuel tank having a rigid vaporizing tube secured thereto, said tank and tube adapted to be received in said casing when detached, said tube having a sliding connection co-operating with said stove and adapted to connect the same thereto whereby the tank and connection can be quickly detached and disposed in said casing or attached to the stove with the tank located outside of said casing.

14. A folding camp stove having in combination, a casing having an aperture through one end thereof, a burner stove permanently secured wholly within said casing and comprising a mixing chamber, a detachable fuel tank and a rigid vaporizing tube secured thereto adapted to be received in said casing when detached, a regulating valve between the tank and the end of said tube being adapted to pass through said aperture in the casing and said tube having a sliding connection co-operating with said stove to connect the same to the mixing chamber when the stove is set up for use.

15. A folding camp stove having in combination, a casing, a burner stove permanently secured therein, one of the burners of which has a combined burner cap and priming cup, a detachable fuel tank and a rigid vaporizing tube attached thereto, adapted to be received in said casing when detached, said tube having a slidably attachable and detachable connection with said stove and adapted to be disposed over said combined cap and priming cup when attached and the stove is assembled for use.

16. A folding camp stove having in combination, a casing, a burner stove secured and wholly disposed therein, a grid supported by said casing above said stove, a detachable fuel tank and rigid connection therefor adapted to be disposed when detached at one side and end, respectively, of said stove and under said grid.

17. A folding camp stove having in combination a substantially rectangular casing having draft openings therein, a stove having a plurality of burners secured in said casing, means for supporting a grid above said burners, a fuel tank having a rigid connecting member thereon, said connecting member adapted to pass through one end of said casing and be connected to said stove, and a regulating valve adapted to project through the other end of said casing to regulate said stove, when said stove is set up for use, said fuel tank and connection being adapted to be disposed in said casing with said stove when not in use.

In testimony whereof I affix my signature.

HANS C. HANSON.

Certificate of Correction.

It is hereby certified that in Reissue Letters Patent No. 15,325, granted April 4, 1922, upon the application of Hans C. Hanson, of Albert Lea, Minnesota, for an improvement in "Folding Camp Stoves," errors appear in the printed specification requiring correction as follows: Page 4, line 14, claim 14, after the word "tube" insert the comma and words , *said tube*, and line 15, strike out the words "said tube"; and that the said Letters Patent should be read with these corrections therein that the same may conform to the record of the case in the Patent Office.

Signed and sealed this 8th day of August, A. D., 1922.

[SEAL.]

KARL FENNING,

*Acting Commissioner of Patents.*